(12) United States Patent  (10) Patent No.: US 7,947,326 B1
Marshall  (45) Date of Patent: May 24, 2011

(54) METHODS OF FORMING A FLUIDIZED BED OF CIRCULATING PARTICLES

(75) Inventor: Douglas W. Marshall, Blackfoot, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 990 days.

(21) Appl. No.: 11/536,361

(22) Filed: Sep. 28, 2006

(51) Int. Cl.
*C23C 16/00* (2006.01)

(52) U.S. Cl. ............ 427/213; 427/182; 427/248.1; 427/255.5

(58) Field of Classification Search .......... 427/213; 118/716
See application file for complete search history.

(56) References Cited

U.S. PATENT DOCUMENTS

| | | |
|---|---|---|
| 3,398,718 A | 8/1968 | Pilloton |
| 3,566,830 A | 3/1971 | Flamm |
| 4,080,927 A | 3/1978 | Brown |
| 4,098,224 A | 7/1978 | Noren et al. |
| 4,116,160 A | 9/1978 | Langley et al. |
| 4,221,182 A | 9/1980 | Brown |
| 4,271,207 A | 6/1981 | Loser et al. |
| 4,342,284 A | 8/1982 | Loser et al. |
| 4,627,812 A * | 12/1986 | Kelly et al. .......... 431/7 |
| 4,639,383 A * | 1/1987 | Casey .......... 427/213 |
| 4,875,435 A | 10/1989 | Jan et al. |
| 5,480,617 A | 1/1996 | Uhlemann et al. |
| 5,810,934 A | 9/1998 | Lord et al. |
| 6,410,087 B1 * | 6/2002 | Wilde et al. .......... 427/249.1 |
| 6,441,108 B1 | 8/2002 | Haendeler et al. |
| 6,695,919 B2 | 2/2004 | Jones et al. |
| 6,719,897 B1 | 4/2004 | Maltin |

FOREIGN PATENT DOCUMENTS

DE 2102438 8/1972

OTHER PUBLICATIONS

International Preliminary Report on Patentability, International Application No. PCT/US07/073257, International Filing Date Jul. 11, 2007.
Noren et al., "Evolution of Coating Gas Distributors," General Atomics Project No. 3632, EG&G Subcontract No. C90-10240, PC-000345, Revision 0, Sep. 1992.

* cited by examiner

*Primary Examiner* — David Turocy
(74) *Attorney, Agent, or Firm* — TraskBritt

(57) ABSTRACT

There is disclosed an apparatus for forming a fluidized bed of circulating particles. In an embodiment, the apparatus includes a bottom portion having a sidewall, the sidewall defining a curvilinear profile, and the bottom portion configured to contain a bed of particles; and a gas inlet configured to produce a column of gas to carry entrained particles therein. There is disclosed a method of forming a fluidized bed of circulating particles. In an embodiment, the method includes positioning particles within a bottom portion having a sidewall, the sidewall defining a curvilinear profile; producing a column of gas directed upwardly through a gas inlet; carrying entrained particles in the column of gas to produce a fountain of particles over the fluidized bed of circulating particles and subside in the particle bed until being directed inwardly into the column of gas within the curvilinear profile.

9 Claims, 16 Drawing Sheets

METHODS OF FORMING A FLUIDIZED BED OF CIRCULATING PARTICLES

GOVERNMENT RIGHTS

This invention was made with government support under Contract No. DE-AC07-05ID14517 awarded by the United States Department of Energy. The government has certain rights in the invention.

BACKGROUND

Gases passing up through an accumulation of particles with sufficient velocity induce movement of the particles and bulk circulation of the particles in containment. Particles become levitated by the gases as a result of momentum and energy transfer. A bed of circulating particles that are levitated in a fluid are "fluidized" in that the mixture of solids and gases take on fluid-like properties and characteristics.

A typical fluidized bed is shown in FIG. 1. FIGS. 2-6 illustrate examples of several specific types of fluidized beds, which include an expanded bed 100 (FIG. 1), a slugging bed 200 (FIG. 2), a bubbling bed 300 (FIG. 3), a channeling bed 400 (FIG. 4), and a spouted bed 500 (FIGS. 5 and 6).

Slugging bed 200 (FIG. 2) has bubbles in layer 205 that divide bed 200 into particle containing layers 210. Boiling bed 300 (FIG. 3) has bubbles 305 that are many times larger than the solid particles 310. Channeling bed 400 (FIG. 4) forms channels 405 in bed 400 by gas passing through particles 410 and most of the gas passes through channels 405 rather than particles 410.

Spouting bed 500 (FIGS. 5 and 6) has gas traveling through bed 500 to form a single spout 515 through which some particles 510 are elevated by a central gas column 505 and ejected out of the particle bed to form a fountain of particulates 525, and then fall to outside of spout 505. At higher airflow rates, agitation may become more violent and the movement of solids may become more vigorous.

Spouted bed 500 is one type of fluidized bed commonly found with larger and denser particles. In spouted bed 500, a column 505, which passes through solids 510, forms a chimney 515, which is also referred to as a spout 515, which gases and entrained particles pass through. As the spouted gases with entrained particles erupt through a top surface of the bed at 520, the gases disperse and the particles disengage and fall back to the bed surface 520 forming the "fountain" 525 of particles.

Spouted beds 500 usually include a cylindrical body 527 with a conical bottom portion 530. A straight wall 535 generally forms conical bottom portion 530. Conical bottom portion 530 confines fluidizing gases at an apex 540 and causes the fluidizing gases to have a much higher velocity than elsewhere in the bed 500. This may cause particles to slug as a group in the area of apex 540, just above a gas inlet 545. Such slugging action induces vertical reciprocation in the bed 500 that abrades particles against other particles 510 and the wall 535 of the vessel. A portion of the potential and kinetic energy supplied by gas stream 515 is expended in inducing the reciprocations. This use of the bottom portion 530 having a conical shape can lead to a condition where a "flat" slug forms at the base of the particle emulsion, directly over the gas inlet 545, which lifts the particles until the gas can create a spout along the axis of symmetry. At this point, the bed 500 drops, nearly filling the apex 540 of the cone at the inlet 545. The slugging action moves the particles in the descending emulsion in a reciprocating manner, causing particles to collide and rub against other particles 510 and the vessel wall 535. This action abrades and attrits away the surface portion from the particles 510, which is not desirable in coating and drying applications.

For example, nuclear fuel particle coating is a chemical vapor deposition process that can take place in a spouted bed. The abrasion may cause flattened surfaces and irregular (non-spherical) particle shapes, resulting in localized stress concentrations in the shells of coated nuclear fuel particles that may lead to an increased probability of failure in service. Abrasion of grain, coal particles, and other carbonaceous materials can lead to explosive dust mixtures in air. In combustion processes, however, the abrasion may be favorable because it helps to remove ash from the particles that would otherwise impede transport of oxygen to the fuel surface and transport of combustion gases away from the particle.

In nuclear fuel coating operations, reactive gases spouting into the bed decompose to form a condensing species (e.g., pyrocarbon, silicon carbide, or other ceramic) that coat the particles. A void created by the movement of gases above the gas inlet, together with slugging action, repeatedly exposes the gas inlet and adjacent wall surfaces to hot reactive gases and the condensing species. This leads to the deposition of accretions near and within the inlet port that causes a maldistribution of gases, interferes with discharging coated particles from the coater vessel when the coating process is complete, and will ultimately require the coater vessel to be dismantled for cleaning or replacement. Furthermore, chipped material from the accretions become entrained in the emulsion and may form counterfeit fuel particles or interfere with uniform deposition of the coatings on a particle, thus increasing the particle failure and rejection rates.

SUMMARY OF THE INVENTION

In an embodiment, there is provided apparatus for forming a fluidized bed of circulating particles, the apparatus comprising a bottom portion having a sidewall, a first end and a second end in opposition to one another, the bottom portion defining a longitudinal axis extending between the first end and the second end, the longitudinal axis disposed adjacent a centroid between opposed portions of the sidewall, the sidewall defining a curvilinear profile within a cross-sectional view of a plane extending in a parallel direction from the longitudinal axis through the sidewall, and the bottom portion configured to contain a bed of particles having a top surface; and a gas inlet positioned at the first end of the bottom portion and in alignment with the longitudinal axis, the gas inlet configured to produce a column of gas directed upwardly, in a direction from the first end to the second end of the bottom portion, along the longitudinal axis of the bottom portion, the column of gas configured to carry entrained particles therein, and the entrained particles and the column of gas configured to erupt through the top surface of the bed of particles so as to produce a fountain of particles over the fluidized bed of circulating particles.

In another embodiment, there is provided method of forming a fluidized bed of circulating particles, the method comprising positioning a bed of particles within a bottom portion having a sidewall, a first end and a second end in opposition to one another, the bottom portion defining a longitudinal axis extending between the first end and the second end, the longitudinal axis disposed adjacent a centroid between opposed portions of the sidewall, the sidewall defining a curvilinear profile within a cross-sectional view of a plane extending in a parallel direction from the longitudinal axis through the sidewall, and the bed of particles having a top surface within the bottom portion; producing a column of gas directed upwardly, in a direction from the first end to the second end of the bottom portion, along the longitudinal axis of the bottom portion, through a gas inlet positioned at the first end of the bottom portion and in alignment with the longitudinal axis; and carrying entrained particles in the column of gas to erupt through the top surface of the bed of particles so as to produce a fountain of particles over the fluidized bed of circulating particles, wherein the entrained particles subsequently fall upon the top surface of the particle bed, between the column of gas and the sidewall of the bottom portion and subside in the particle bed until being redirected inwardly into the column of gas within the bottom portion with the curvilinear profile.

Other embodiments are also disclosed.

BRIEF DESCRIPTION OF THE DRAWINGS

Illustrative embodiments of the invention are illustrated in the drawings, in which.

DETAILED DESCRIPTION OF THE INVENTION

Figure 2:
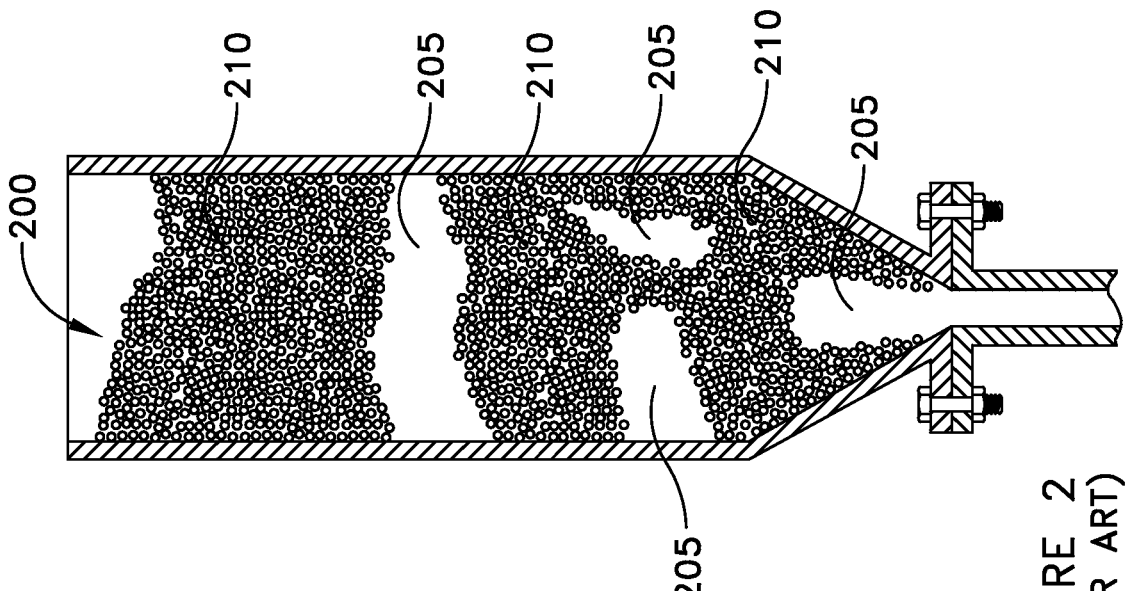
FIG. 2 illustrates a fluidized bed in the form of a slugging bed.
Figure 1:
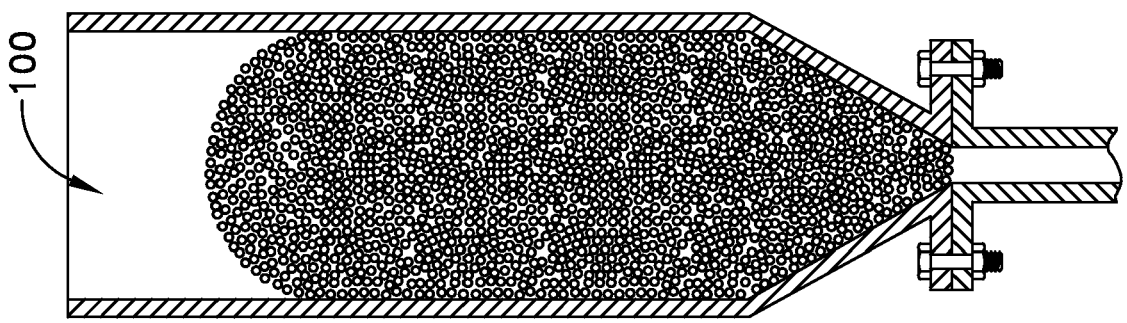
FIG. 1 illustrates a fluidized bed in the form of an expanded bed.
Figure 5:
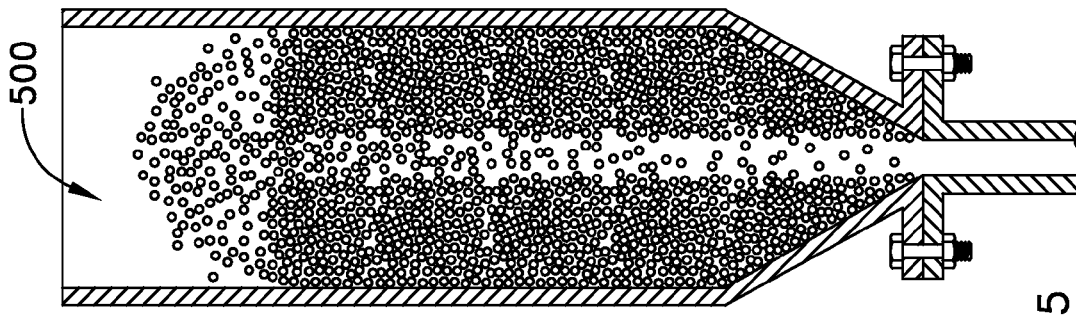
FIG. 5 illustrates a fluidized bed in the form of a spouted bed.
Figure 4:
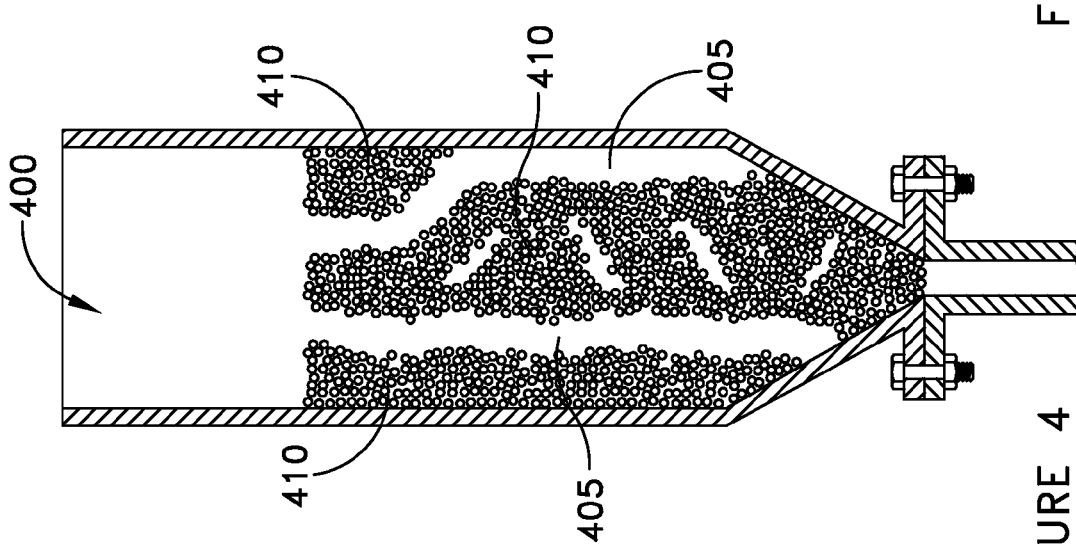
FIG. 4 illustrates a fluidized bed in the form of a channeling bed.
Figure 3:
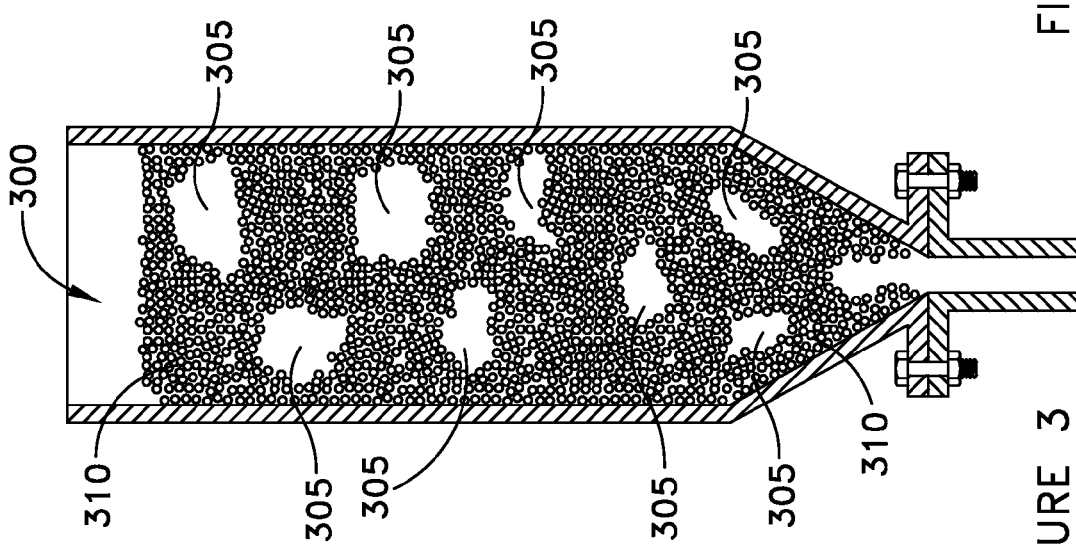
FIG. 3 illustrates a fluidized bed in the form of a bubbling bed.
Figure 6:
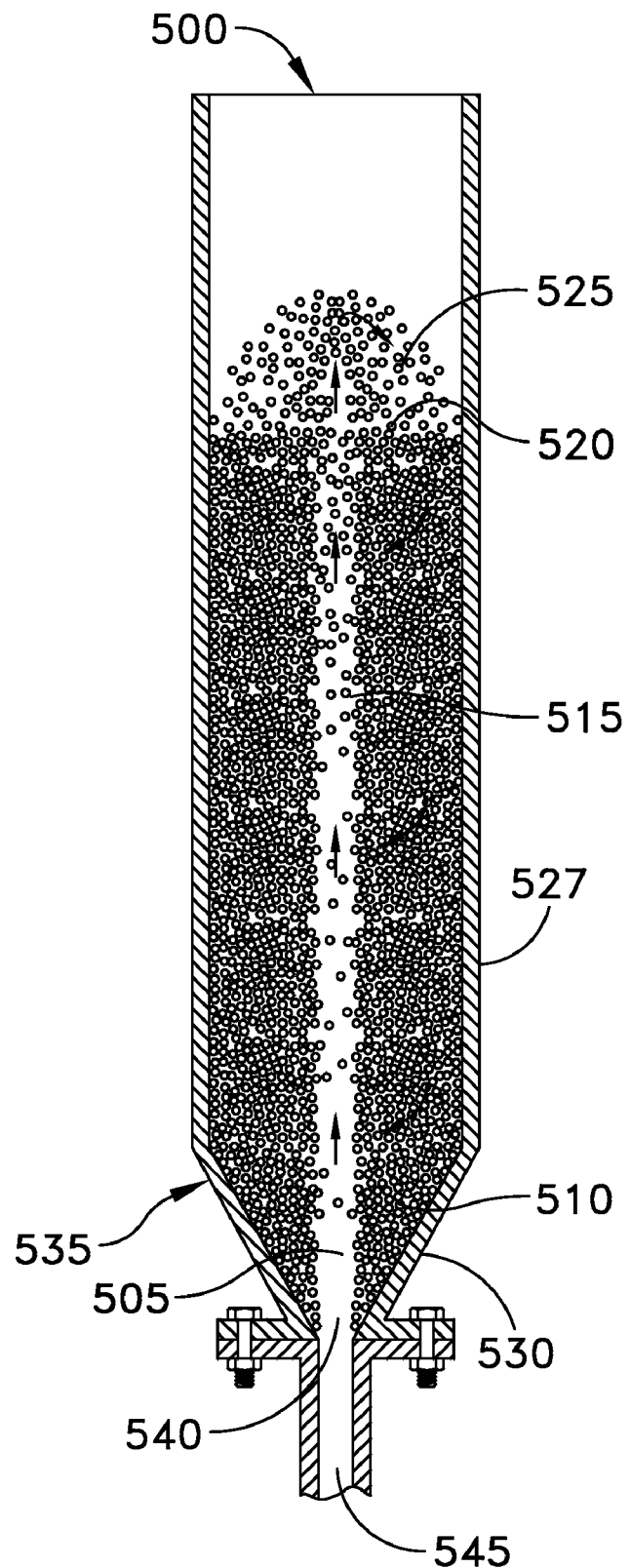
FIG. 6 illustrates another view of a fluidized bed vessel, which may include the fluidized bed shown in FIG. 5.
Figure 7:
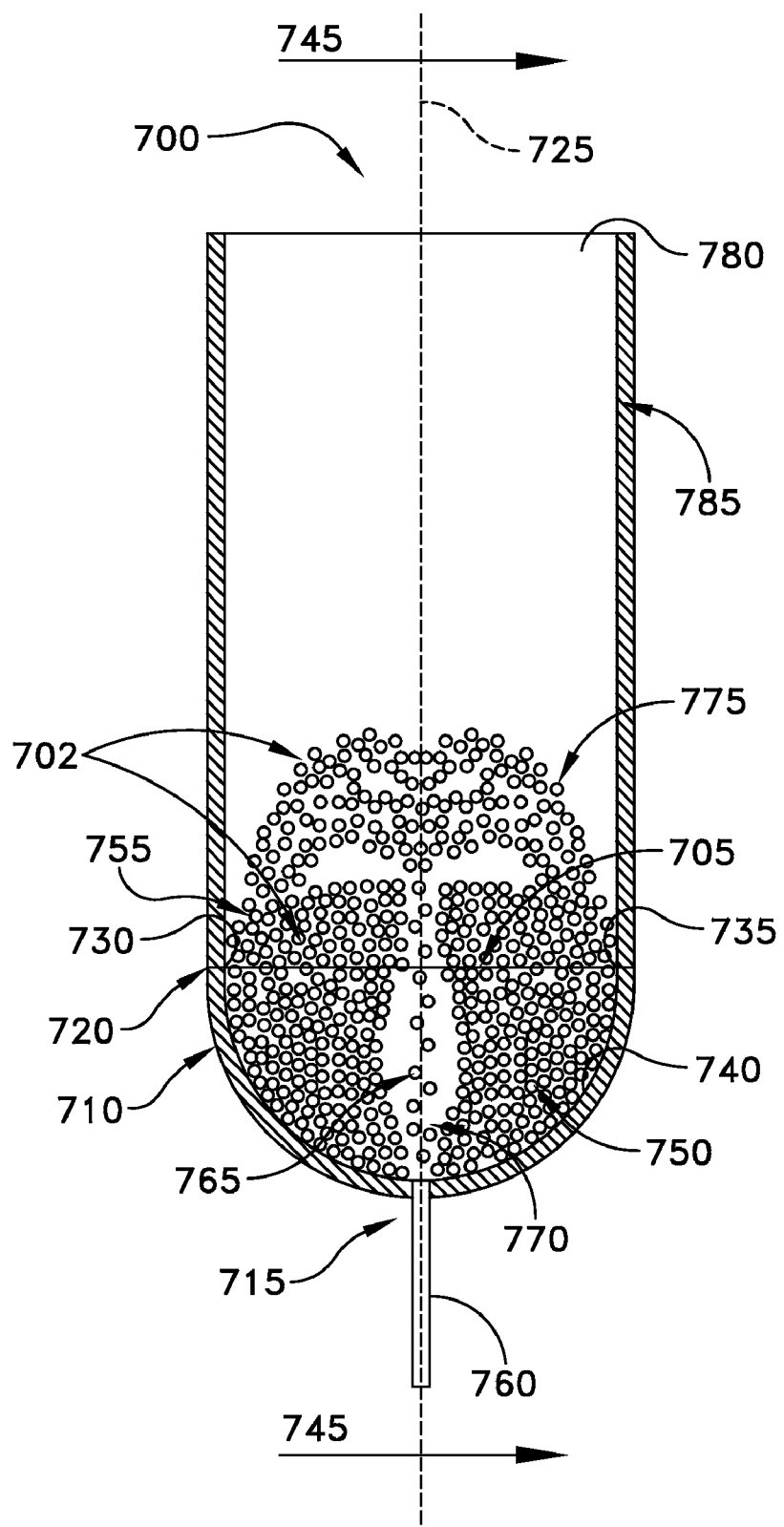
FIG. 7 illustrates apparatus for a fluidized bed having a curvilinear profile adjacent the gas inlet.

Looking at FIG. 7, there is shown an exemplary embodiment of apparatus 700 for forming a fluidized bed of circulating particles 702. FIGS. 8-19 illustrate other embodiments, which may have similar components as those described hereinbelow for apparatus 700.

Apparatus 700 may include a bottom portion 705 having a sidewall 710, a first end 715 and a second end 720 in opposition to one another. Bottom portion 705 may define a longitudinal axis 725 extending between first end 715 and second end 720. Longitudinal axis 725 is disposed adjacent a centroid between opposed portions 730, 735 of sidewall 710. Sidewall 710 defines a curvilinear profile 740 within a cross-sectional view of a plane 745 extending in a parallel direction from longitudinal axis 725 through sidewall 710. Bottom portion 705 is configured to contain a bed of particles 750, which may also be described as annulus 750, or circulating annulus 750. The bed of particles 750 may include a top surface 755.

A gas inlet 760 is positioned at first end 715 of bottom portion 705 and in alignment with longitudinal axis 725. Gas inlet 760 is configured to produce a column of gas 765 directed upwardly, in a direction from first end 715 to second end 720 of bottom portion 705, and along longitudinal axis 725 of bottom portion 705. Column of gas 765 is configured to carry entrained particles 770 therein. Entrained particles 770 and column of gas 765 are configured to erupt through top surface 755 of the bed of particles 750 so as to produce a fountain of particles 775 with fluidized bed of circulating particles 702.

In an embodiment, an upper portion 780 may be provided having a sidewall 785 extending upwardly from second end 720 of bottom portion 705.

The profile of the bottom has a profound effect on the circulation pattern for the solids. A curvilinear profile complements natural convection patterns and enables enhanced particle circulation and decreased particle abrasion without changing overall process parameters such as temperature, pressure, gas flow rate, etc.

The novel spouted bed devices described hereinabove, such as apparatus 700, may be used for contacting gases and solids having particles with sufficient density and size that are readily spoutable. The novel spouted bed devices may also be used for coating pharmaceuticals, drying grain, coating nuclear fuels and other applications such as the devolitization, conversion, or combustion of biomass and other carbonaceous materials.

Such a curved bottom gently accelerates particles toward the center axis and decelerates the vertical descent of the particles. In one embodiment, the curved bottom complements natural convection currents within the emulsion, and induces smooth and uniform circulation of the particles in the bed. The spout is more stable and the particle emulsion does not form a flat slug at the gas inlet. Particle attrition and abrasion are reduced, which results in less dusting and less damage to particles. The smooth emulsion circulation may result in more uniform exposure of particles to the coating substances, such uniform exposure may provide more uniform coating thicknesses. This may also create a narrower statistical distribution in the coating thicknesses, particle diameters, and particle sphericities. Smooth emulsion circulation may also provide higher heat transfer and more uniform temperature distributions. Prior art approaches have previously concentrated on gas distribution to achieve smooth emulsion flow with improved coatings or drying operations. Some of these prior art gas distribution systems are complex. In one embodiment, the gas distribution system is simple and passive. In other embodiments, complex gas distributors may be used. In chemical vapor deposition processes, such as nuclear fuel particle coating, condensing species deposit on exposed particle surfaces. When particle circulation is impaired, the deposition is greater on interstitial surfaces. Since particles will align themselves with flat surfaces against one another, the interstitial deposition exacerbates the angularity and decreases sphericity. Any improvement in the circulation rate will improve sphericity.

Figure 8:
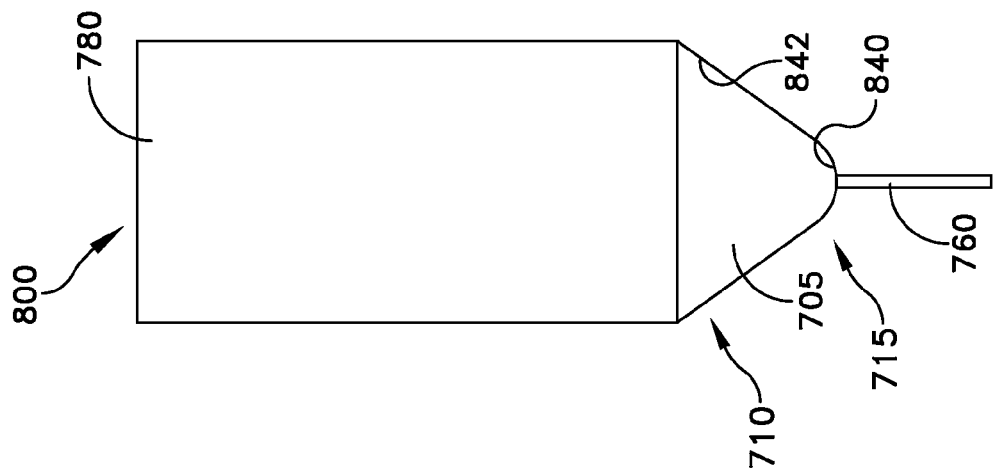
FIG. 8 illustrates apparatus for a fluidized bed having a bottom portion with an arcuate section in the rectilinear profile adjacent the gas inlet.

As illustrated in FIG. 8, and in an embodiment, there is shown apparatus 800 in which the curvilinear profile of sidewall 710 may include an arcuate section 840 adjacent first end 715 of bottom portion 705, and a substantially straight section 842 adjacent second end 720 of bottom portion 705. For example, bottom portion 705 of apparatus 800 may include a truncated cone with a spherical bottom having an arcuate radius. In an embodiment, this arcuate radius may be about one-third the radius of the uppermost portion 780.

Figure 9:
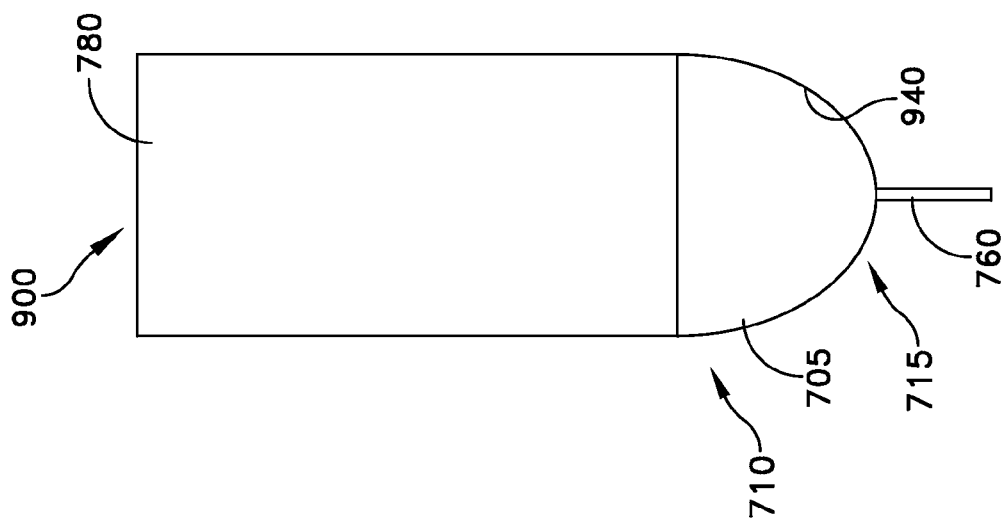
FIG. 9 illustrates apparatus for a fluidized bed having a bottom portion with an ellipsoidal section in the curvilinear profile adjacent the gas inlet.

Referring to FIG. 9, and in one embodiment, there is shown apparatus 900 in which the curvilinear profile of sidewall 710 may include an ellipsoidal section 940 adjacent first end 715 of bottom portion 705.

Figure 10:
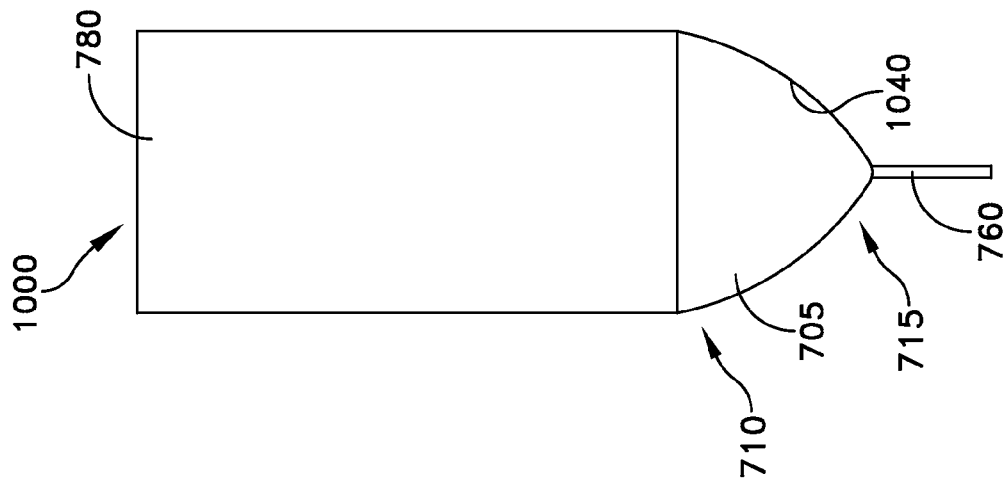
FIG. 10 illustrates an ogival section in the curvilinear profile adjacent the gas inlet.

Looking now at FIG. 10, and in another embodiment, there is shown apparatus 1000 in which curvilinear profile 740 of sidewall 710 may include an ogival section 1040 adjacent first end 715 of bottom portion 705.

Figure 11:
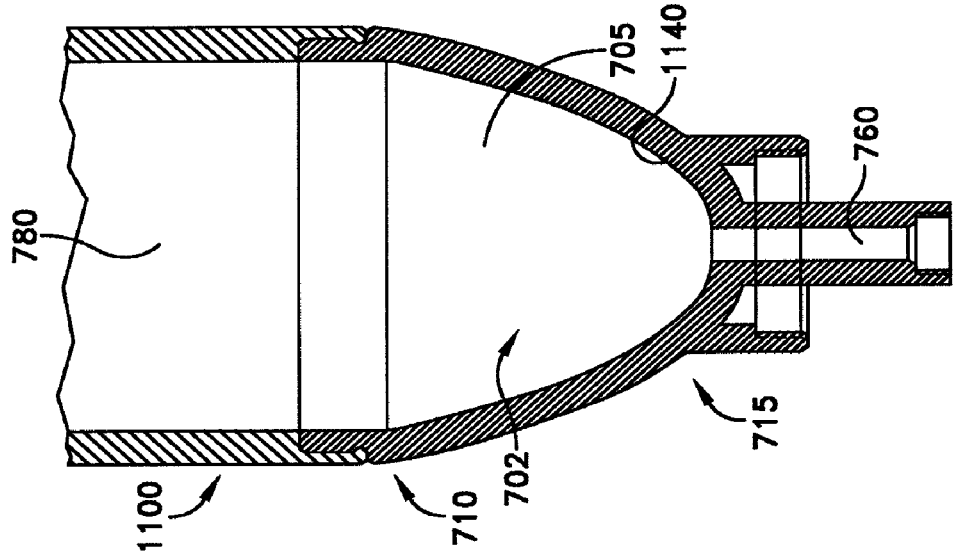
FIG. 11 illustrates a parabolic section in the curvilinear profile adjacent the gas inlet.

FIG. 11 illustrates an embodiment of apparatus 1100 in which curvilinear profile 740 of sidewall 710 may include a parabolic section 1140 adjacent first end 715 of bottom portion 705.

Figure 12:
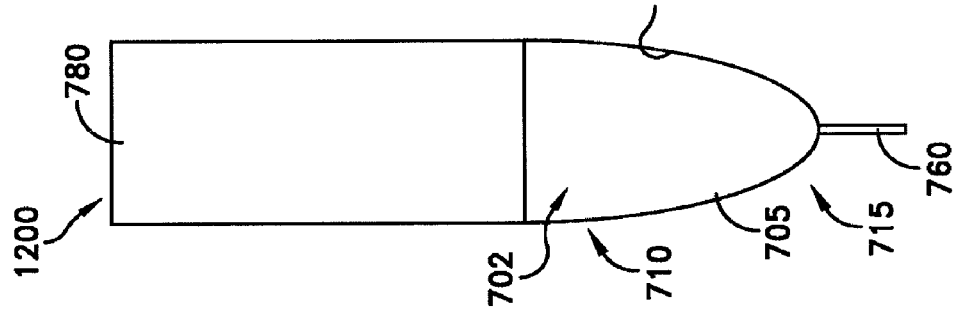
FIG. 12 illustrates a catenary section in the curvilinear profile adjacent the gas inlet.

Referring to FIG. 12, and in an embodiment, there is shown apparatus 1200 in which curvilinear profile 740 of sidewall 710 may include a catenary section 1240 adjacent first end 715 of bottom portion 705.

Figure 13:
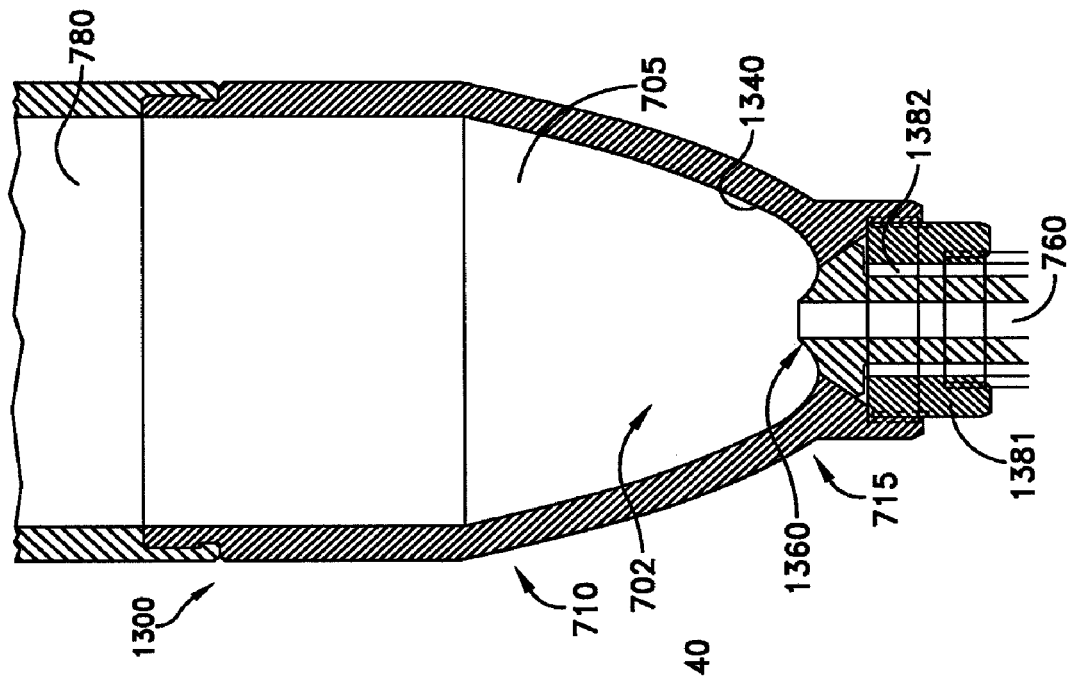
FIGS. 13-20 illustrate various embodiments of apparatus for a fluidized bed in which a bottom portion has a cardioid section in the curvilinear profile adjacent the gas inlet.

Looking at FIG. 13, and in one embodiment, there is illustrated apparatus 1300 in which curvilinear profile 740 of sidewall 710 may include a cardioid section 1340 adjacent first end 715 of bottom portion 705. Auxiliary fluidizing gas passes through a gas inlet 1382 to an annular distribution gap between inlet nozzle 1360 and the wall of the curvilinear bottom. As illustrated, cardioidal section 1340 may be formed from multiple components, which may include a threaded collar 1381 for joining gas inlet 760 and bottom portion 705 to one another.

Figure 14:
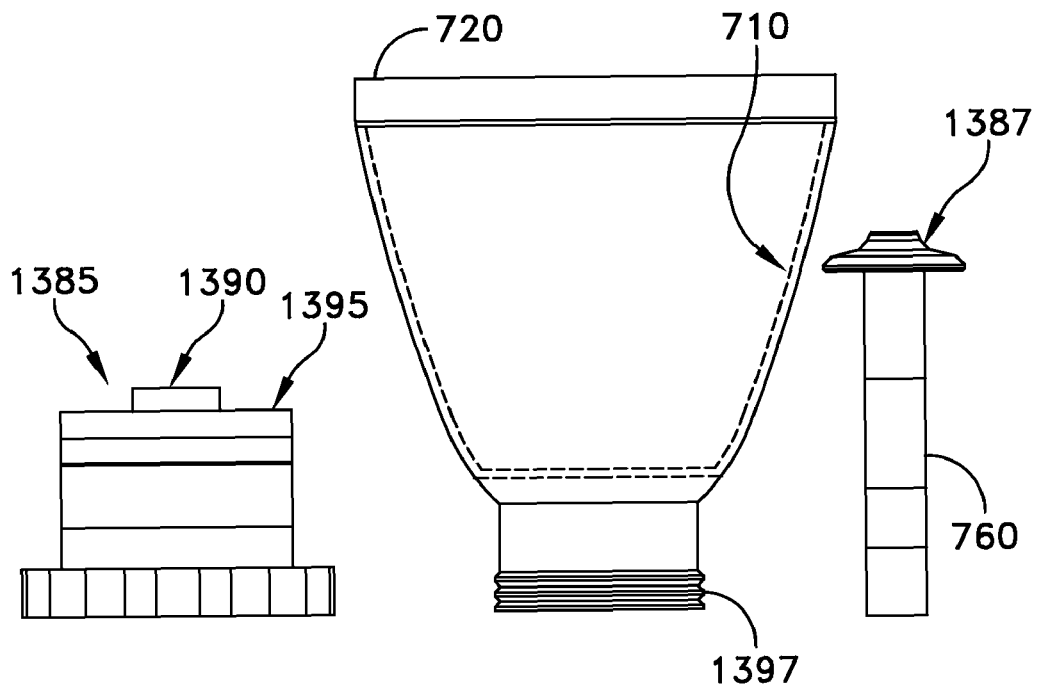
Figure 15:
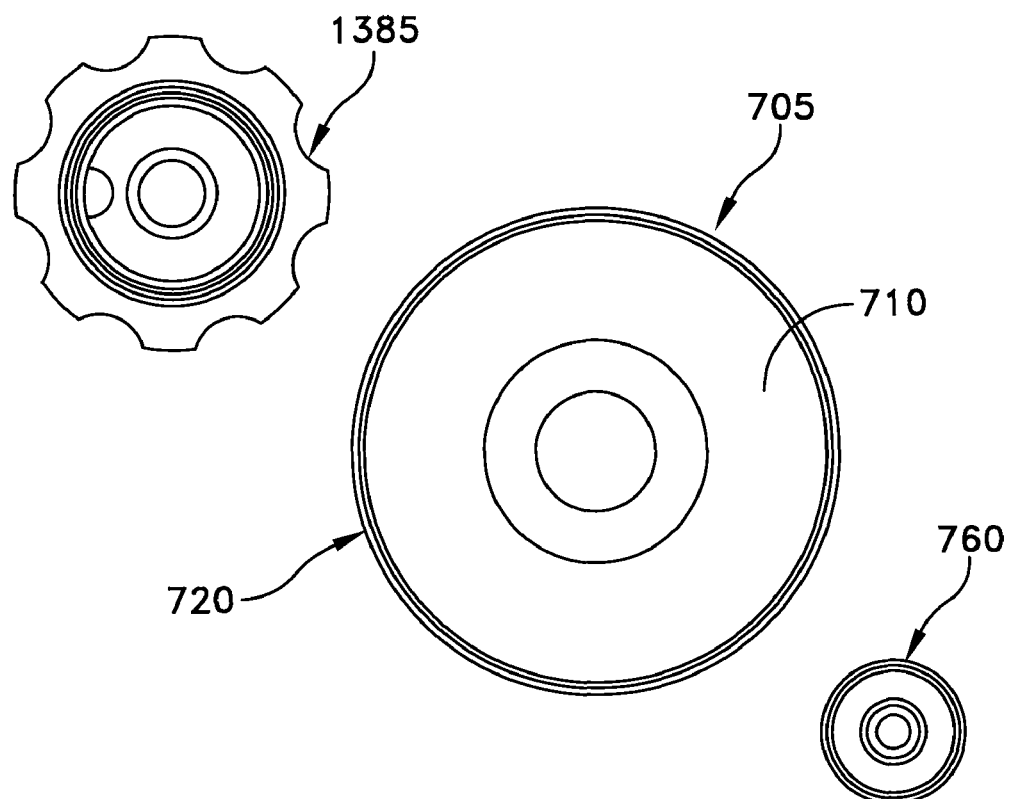
Figure 17:
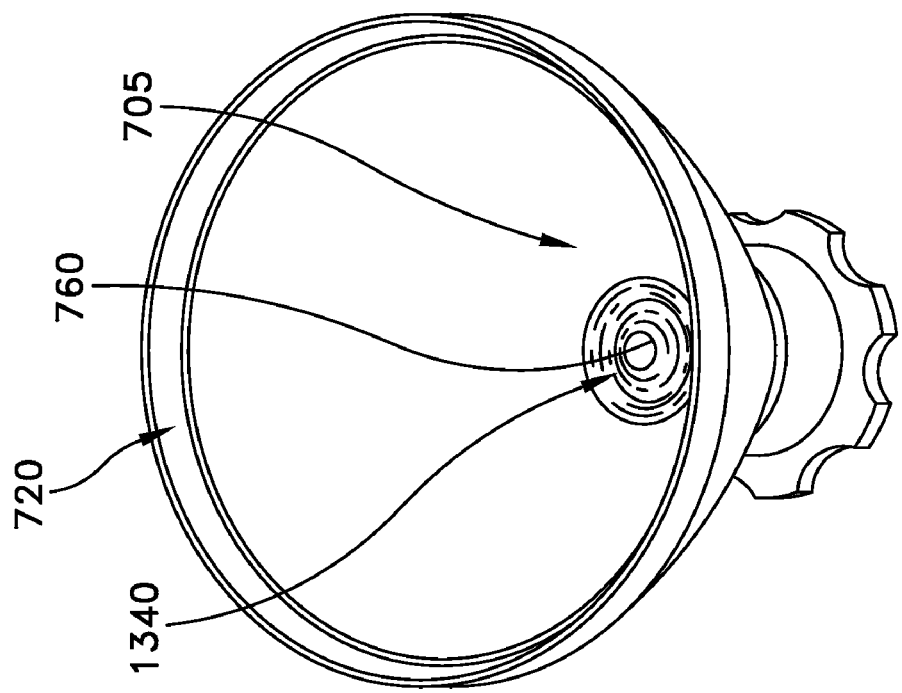
Figure 16:
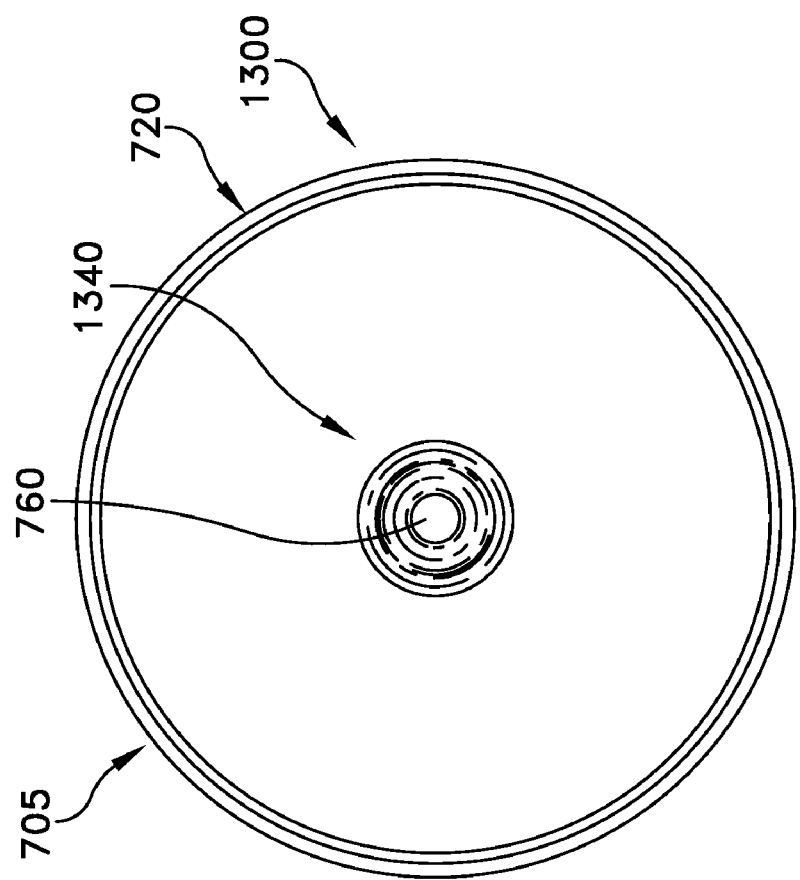
Figure 19:
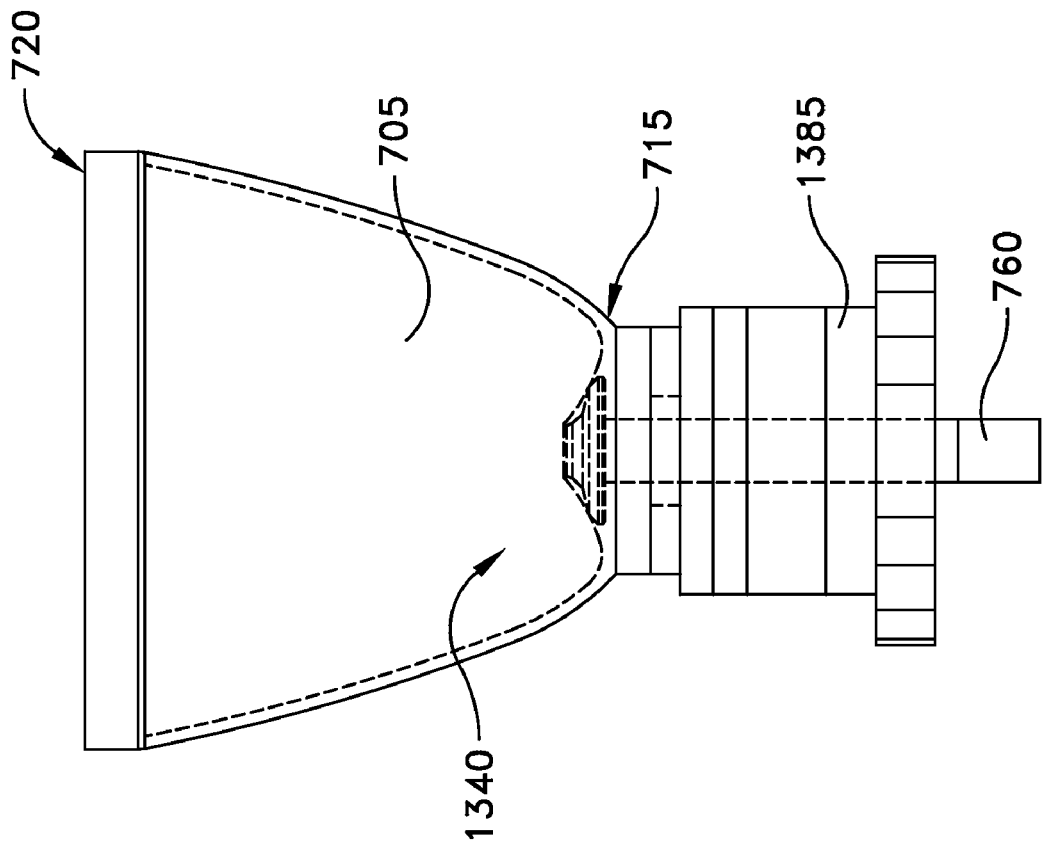
Figure 18:
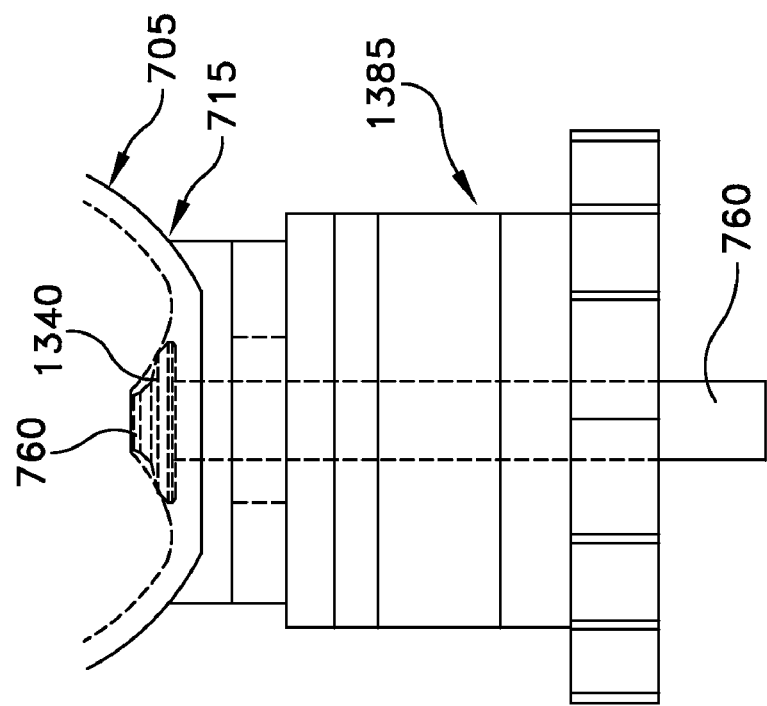

As another example of multiple components forming cardioid section 1340, and best illustrated in FIG. 14, there is shown gas inlet 760 having a flanged portion 1387 (FIG. 14), which forms a portion of cardioid section 1340. A collar 1385 forms a passageway 1390 (FIG. 14) therethrough for receiving gas inlet 760 therein. Collar 1385 may further include a set of screw threads 1395 (FIG. 14) for attachment with a set of screw threads 1397 disposed on bottom portion 705 (FIG. 14). FIGS. 14-19 illustrate the multiple components forming cardioid section 1340 disassembled from one another and assembled together with one another.

Figure 13A:
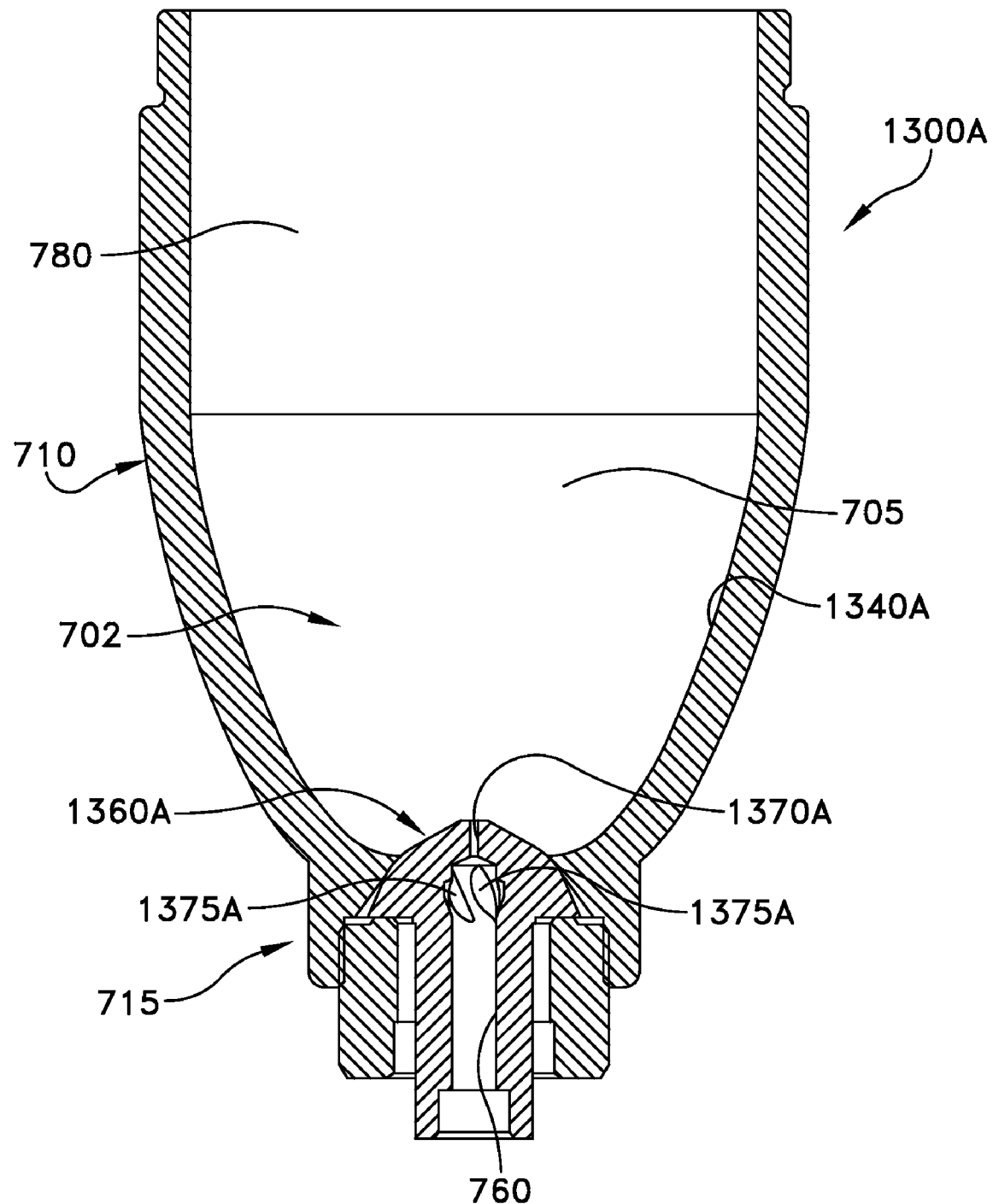
Figure 13B:
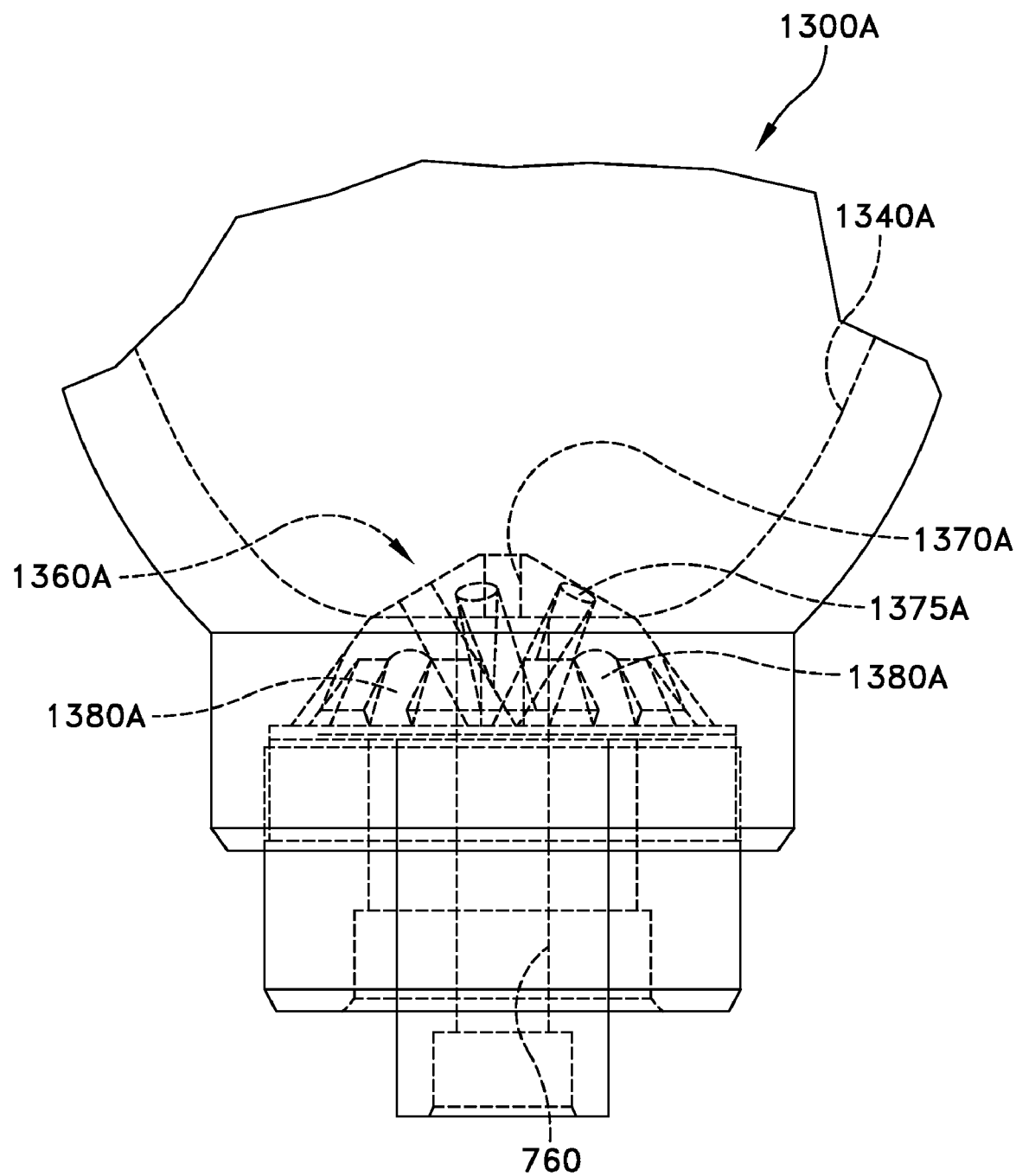
Figure 13E:
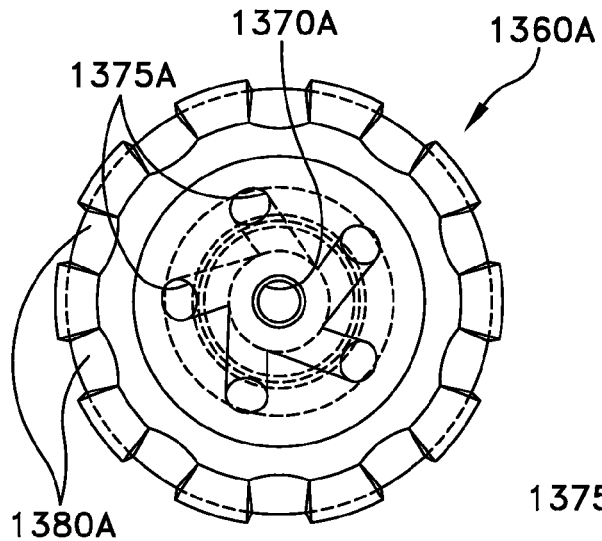
Figure 13D:
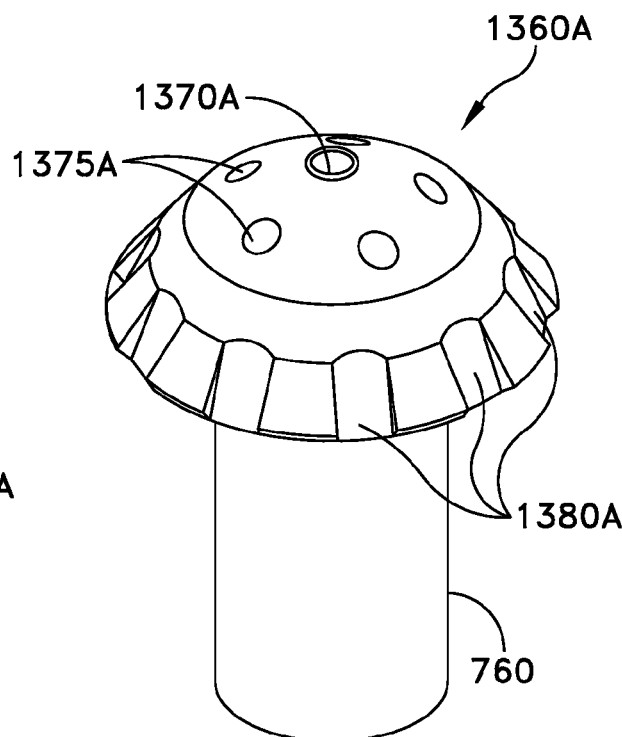
Figure 13C:
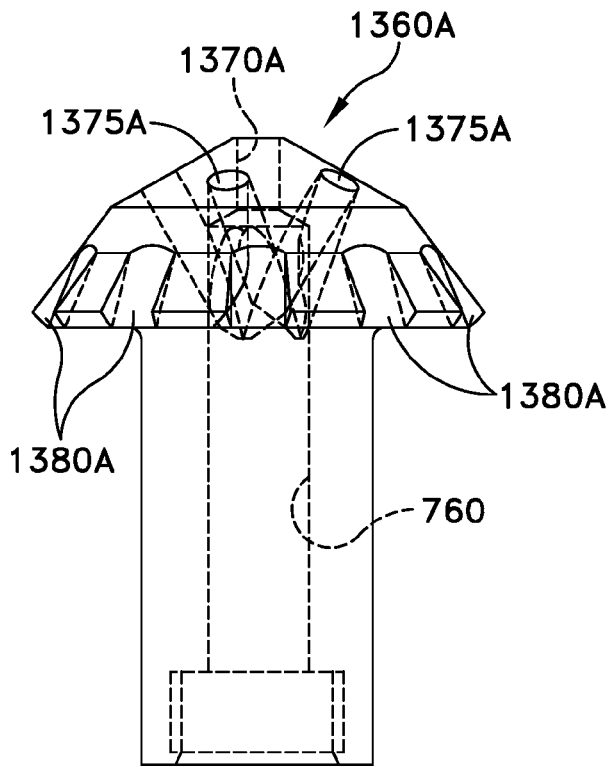

Looking now at FIGS. 13A and 13B, and in one embodiment, there is illustrated apparatus 1300A in which curvilinear profile 740 of sidewall 710 may include a cardioid section 1340A adjacent first end 715 of bottom portion 705. In one embodiment, a multi-port injector nozzle 1360A (instead of a single injector nozzle as gas inlet 760) may form a portion of the cardioid section 1340A. Other embodiments with curvilinear profile 740 may include a multi-port injector nozzle similar to multi-port injector nozzle 1360A.

As shown in FIGS. 13A-13E, a central port 1370A and satellite ports 1375A may be configured in multi-port injector nozzle 1360A. For example, there may be one central port 1370A and five satellite ports 1375A. In an embodiment, inert gas passages 1380A may be provided in the outer margin of multi-port injector nozzle 1360A. Inert gas passages 1380A may create a shield of inert gas to displace reactive gasses (emitted from central port 1370A and satellite ports 1375A) near surfaces of multi-port injector nozzle 1360A in order to reduce accretions.

Figure 13F:
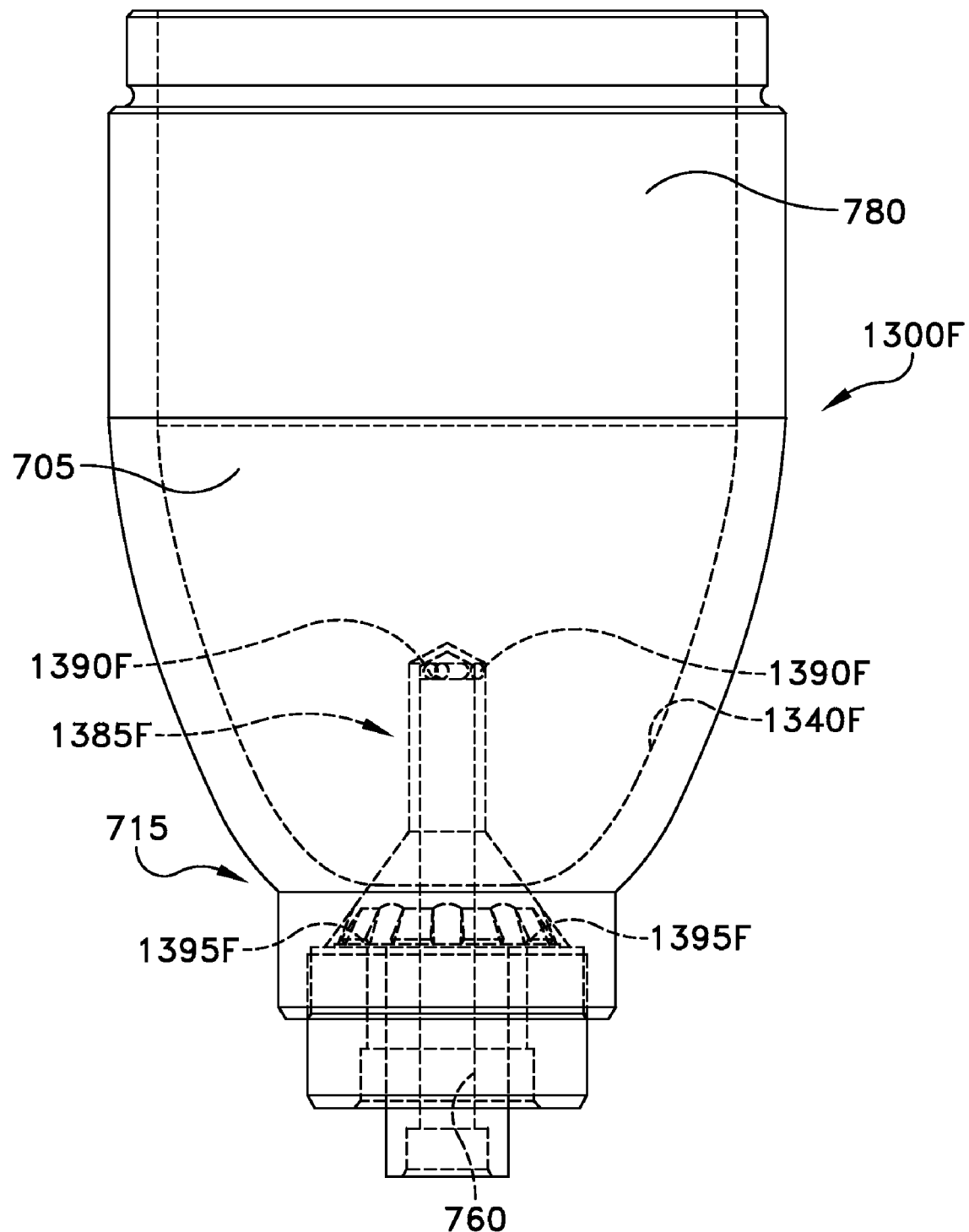

Looking at FIG. 13F, and in one embodiment, there is an illustrated apparatus 1300F in which curvilinear profile 740 of sidewall 710 may include a cardioid section 1340F adjacent first end 715 of bottom portion 705. In one embodiment, a gas distribution tuyere 1385F (instead of a single-port or multi-port injector nozzle as gas inlet 760) may form a portion of the cardioid section 1340F. Other embodiments with curvilinear profile 740 may include a multi-port injector nozzle similar to multi-port injector nozzle 1360A.

Figure 13H:
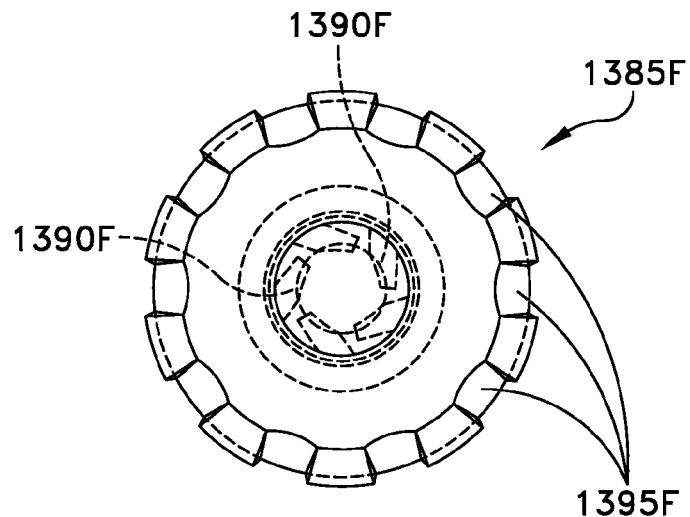
Figure 13G:
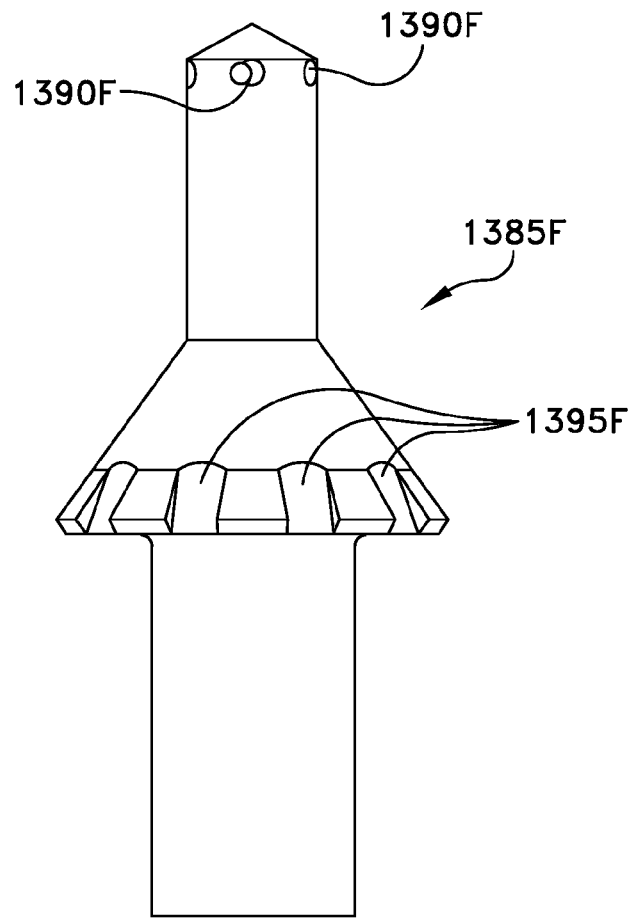

As shown in FIGS. 13F-13H, a set of ports 1390F may be configured in gas distribution tuyere 1385F. For example, ports 1390F may be disposed at an angle through the sidewall of gas distribution tuyere 1385F in order to create a desired flow of gas. In an embodiment, inert gas passages 1395F may be provided in the outer margin of gas distribution tuyere 1385F. Inert gas passages 1395F may create a shield of inert gas to displace reactive gasses (emitted from ports 1390F) near surfaces of gas distribution tuyere 1385F in order to reduce accretions.

Figure 20:
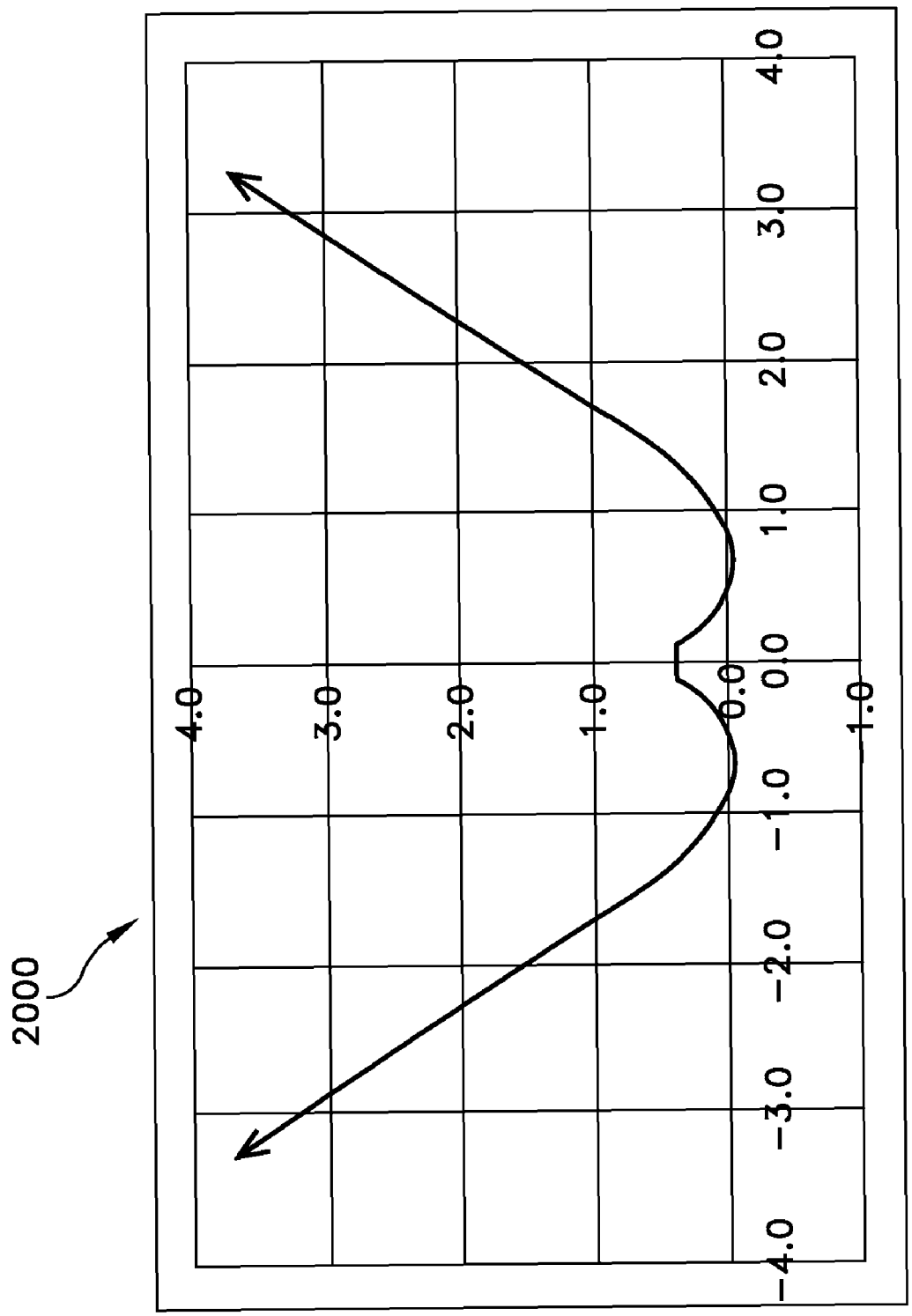

Looking at FIG. 20, there is shown a graphical representation 2000 of one embodiment of a frustum with a cardioidal shape replacing the conical apex.

Figure 21:
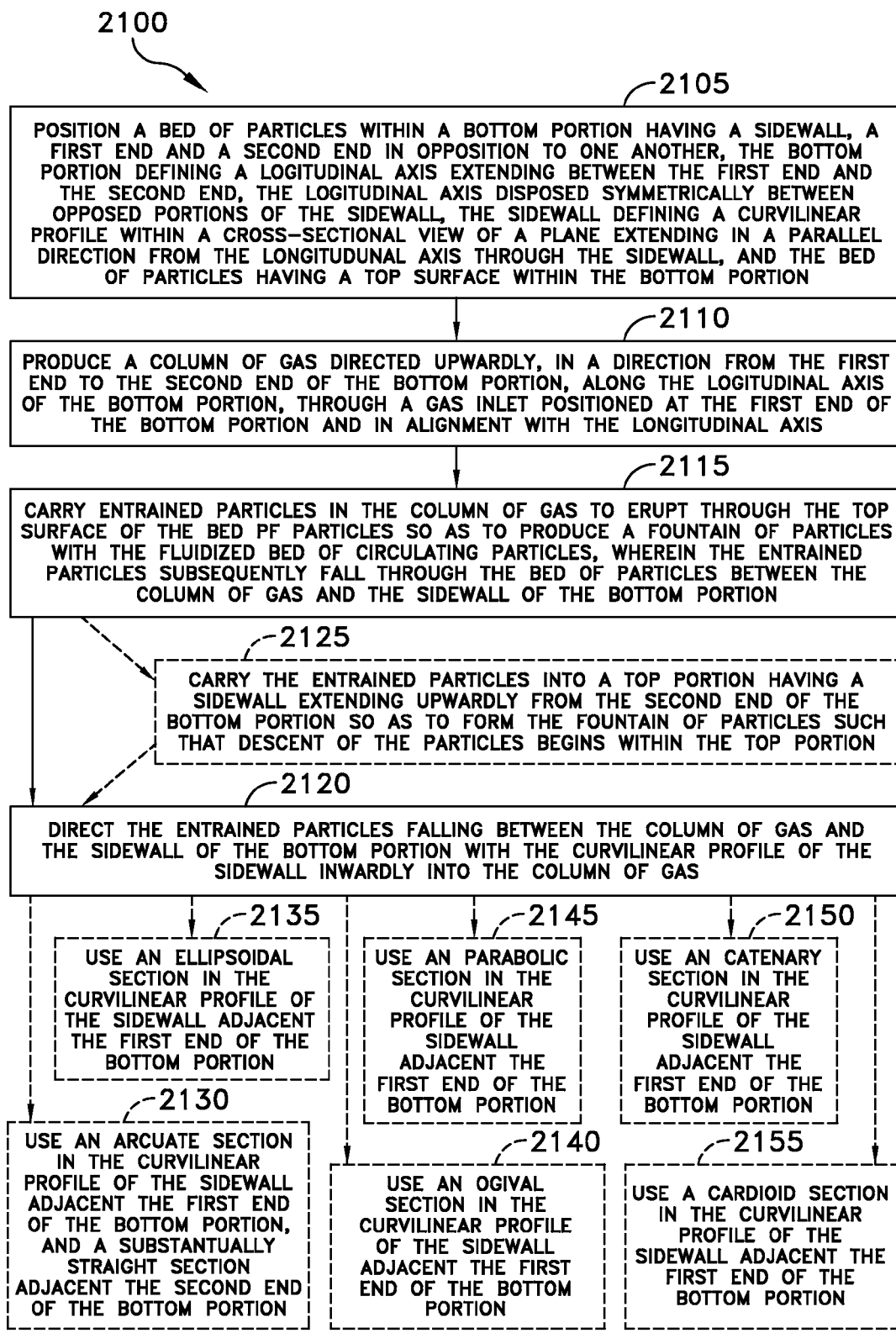
FIG. 21 illustrates a flow chart diagram of an exemplary method of forming a fluidized bed of circulating particles.

Referring now to FIG. 21, there is shown an exemplary embodiment of a method 2100 of forming a fluidized bed of circulating particles. Method 2100 may include positioning 2105 a bed of particles within a bottom portion having a sidewall, a first end and a second end in opposition to one another, the bottom portion defining a longitudinal axis extending between the first end and the second end, the longitudinal axis disposed adjacent a centroid between opposed portions of the sidewall, the sidewall defining a curvilinear profile within a cross-sectional view of a plane extending in a parallel direction from the longitudinal axis through the sidewall, and the bed of particles having a top surface within the bottom portion. Method 2100 may include producing 2110 a column of gas directed upwardly, in a direction from the first end to the second end of the bottom portion, along the longitudinal axis of the bottom portion, through a gas inlet positioned at the first end of the bottom portion and in alignment with the longitudinal axis. Method 2100 may further include carrying 2115 entrained particles in the column of gas to erupt through the top surface of the bed of particles so as to produce a fountain of particles with the fluidized bed of circulating particles, wherein the entrained particles subsequently fall through the bed of particles between the column of gas and the sidewall of the bottom portion. Method 2100 may also include directing 2120 the entrained particles falling between the column of gas and the sidewall of the bottom portion with the curvilinear profile of the sidewall inwardly into the column of gas.

Optionally, the carrying 2115 entrained particles in the column of gas to erupt through the top surface of the bed of particles includes carrying 2125 the entrained particles into a top portion having a sidewall extending upwardly from the second end of the bottom portion so as to form the fountain of particles such that descent of the particles begins within the top portion.

In one exemplary embodiment, the directing 2120 the entrained particles may include using 2130 an arcuate section in the curvilinear profile of the sidewall adjacent the first end of the bottom portion, and a substantially straight section adjacent the second end of the bottom portion. In another embodiment, the directing 2120 the entrained particles may include using 2135 an ellipsoidal section in the curvilinear profile of the sidewall adjacent the first end of the bottom portion. In yet another embodiment, the directing 2120 the entrained particles may include using 2140 an ogival section in the curvilinear profile of the sidewall adjacent the first end of the bottom portion. In still another embodiment, the directing 2120 the entrained particles may include using 2145 a parabolic section in the curvilinear profile of the sidewall adjacent the first end of the bottom portion. In another embodiment, the directing 2120 the entrained particles may include using 2150 a catenary section in the curvilinear profile of the sidewall adjacent the first end of the bottom portion. In still another exemplary embodiment, the directing 2120 the entrained particles may include using 2155 a cardioid section in the curvilinear profile of the sidewall adjacent the first end of the bottom portion.

The curvilinear profile of the novel spouted beds described hereinabove may provide smoother and more rapid particle circulation. The curvilinear profile of the novel spouted beds described hereinabove may also provide a reduction or elimination of reciprocal particle movement in the subsiding annulus. This reduction in movement may also result in reduced particle damage.

For chemical vapor deposition processes, the curvilinear profile of the novel spouted beds may also provide reduced fouling of the gas inlet. The curvilinear profile may provide more efficient gas-solid contacting. Furthermore, the curvilinear may provide more uniform coatings on particles.

The curvilinear profile may provide improved heat transfer and thermal uniformity within the bed. The curvilinear profile of the novel spouted beds may require less frequent cleaning and less regular lower maintenance.

One novel spouted bed reactor has been tested for coating TRIstructural ISOtropic (TRISO) fuel particles. Two other spouted-bed reactors have been used for particle circulation at ambient conditions.

Spouted-bed coaters may be used to apply coatings on pharmaceuticals and nuclear fuel particles. Spouted-bed coaters may also be used to apply pyrocarbon coatings on biomedical implant devices. Enhancement of coating uniformity may be beneficial to pharmaceutical companies and to production of nuclear fuels that use dispersed TRISO fuel particles in a host matrix. Examples are reactors for next generation nuclear energy systems, known as Generation IV (Gen IV) and Next Generation Nuclear Plant (NGNP) reactors, and other high-temperature gas reactors. Dispersion fuels are needed for efficient hydrogen production using nuclear power. Grain drying or coal combustion applications may be performed using a novel spouted bed reactor having a curvilinear sidewall.

What is claimed is:

1. A method of forming a fluidized bed of circulating particles, the method comprising:
    positioning a bed of particles within a bottom portion having a sidewall, a first end, a second end, and a longitudinal axis extending between the first end and the second end along a centroid between opposed portions of the sidewall, the sidewall defining a curvilinear profile within a cross-sectional view of a plane extending in a parallel direction with the longitudinal axis through the sidewall, and the bed of particles having a top surface within the bottom portion;
    producing a column of a first gas directed upwardly, in a direction from the first end to the second end of the bottom portion, along the longitudinal axis of the bottom portion comprising:
        directing the first gas into a single gas inlet formed in a first end of a multi-port injector nozzle positioned at the first end of the bottom portion and in alignment with the longitudinal axis, through the multi-port injector nozzle, and exiting the multi-port injector nozzle at a plurality of outlet ports comprising a central port and a plurality of satellite ports surrounding the central port formed in the multi-port injector nozzle at a second, opposing end of the multi-port injector nozzle; and
        directing a second, inert gas, separate from the first gas, through a plurality of inert gas passages formed in an outer margin of the multi-port injector nozzle to displace gases from the column of the first gas away from surfaces of the bottom portion proximate to the outer margin of the multi-port injector nozzle;
    carrying particles from the first end of the bottom portion entrained in the column of the first gas to erupt through the top surface of the bed of particles so as to produce an at least substantially symmetrical fountain of particles over the bed of particles, wherein the particles entrained in the column of the first gas subsequently fall upon the top surface of the bed of particles between the column of the first gas and the sidewall of the bottom portion and subside in the bed of particles; and
    directing the particles inwardly into the column of the first gas within the bottom portion using the curvilinear profile.

2. The method of claim 1, wherein directing the particles inwardly into the column of the first gas within the bottom portion using the curvilinear profile comprises directing the particles inwardly into the column of the first gas within the bottom portion using an arcuate section in the curvilinear profile of the sidewall adjacent the first end of the bottom portion and a substantially straight section adjacent the second end of the bottom portion.

3. The method of claim 1, wherein directing the particles inwardly into the column of the first gas within the bottom portion using the curvilinear profile comprises directing the particles inwardly into the column of the first gas within the bottom portion using an ellipsoidal section in the curvilinear profile of the sidewall adjacent the first end of the bottom portion.

4. The method of claim 1, wherein directing the particles inwardly into the column of the first gas within the bottom portion using the curvilinear profile comprises directing the particles inwardly into the column of the first gas within the bottom portion using an ogival section in the curvilinear profile of the sidewall adjacent the first end of the bottom portion.

5. The method of claim 1, wherein directing the particles inwardly into the column of the first gas within the bottom portion using the curvilinear profile comprises directing the particles inwardly into the column of the first gas within the bottom portion using a parabolic section in the curvilinear profile of the sidewall adjacent the first end of the bottom portion.

6. The method of claim 1, wherein directing the particles inwardly into the column of the first gas within the bottom portion using the curvilinear profile comprises directing the particles inwardly into the column of the first gas within the bottom portion using a catenary section in the curvilinear profile of the sidewall adjacent the first end of the bottom portion.

7. The method of claim 1, wherein directing the particles inwardly into the column of the first gas within the bottom portion using the curvilinear profile comprises directing the particles inwardly into the column of the first gas within the bottom portion using a cardioid section in the curvilinear profile of the sidewall adjacent the first end of the bottom portion.

8. The method of claim 1, wherein producing a column of the first gas directed upwardly further comprises feeding the first gas through the multi-port injector nozzle comprising a gas distribution tuyere extending into the fluidized bed and having the plurality of outlet ports formed in a lateral sidewall of the multi-port injector nozzle.

9. The method of claim 1, further comprising at least substantially uniformly exposing the particles in the particle bed to the first gas.

* * * * *

UNITED STATES PATENT AND TRADEMARK OFFICE
CERTIFICATE OF CORRECTION

PATENT NO. : 7,947,326 B1  
APPLICATION NO. : 11/536361  
DATED : May 24, 2011  
INVENTOR(S) : Douglas W. Marshall Page 1 of 1

It is certified that error appears in the above-identified patent and that said Letters Patent is hereby corrected as shown below:

In the drawings:

In FIG. 21, box 2105, 3$^{rd}$ line of text
   change "LOGITUDINAL" to --LONGITUDINAL--
In FIG. 21, box 2105, 4$^{th}$ line of text
   change "LOGITUDINAL" to --LONGITUDINAL--
In FIG. 21, box 2105, 7$^{th}$ line of text
   change "LONGITUDUNAL" to --LONGITUDINAL--
In FIG. 21, box 2110, 2$^{nd}$ line of text
   change "LOGITUDINAL" to --LONGITUDINAL--
In FIG. 21, box 2145, 1$^{st}$ line of text
   change "AN PARABOLIC" to --A PARABOLIC--
In FIG. 21, box 2150, 1$^{st}$ line of text
   change "AN CATENARY" to --A CATENARY--

Signed and Sealed this
Twenty-seventh Day of August, 2013

Teresa Stanek Rea
*Acting Director of the United States Patent and Trademark Office*